United States Patent
Zhao

(10) Patent No.: US 10,732,496 B2
(45) Date of Patent: Aug. 4, 2020

(54) COLOR WHEEL AND LASER PROJECTION APPARATUS

(71) Applicants: Hisense Co., Ltd., Qingdao, Shandong (CN); HISENSE USA CORP., Suwanee, GA (US); Hisense International Co., Ltd., Qingdao, Shandong (CN)

(72) Inventor: Fei Zhao, Shandong (CN)

(73) Assignees: HISENSE CO., LTD., Qingdao, Shandong (CN); HISENSE USA CORP., Suwanee, GA (US); HISENSE INTERNATIONAL CO., LTD., Qingdao, Shandon (CN)

( * ) Notice: Subject to any disclaimer, the term of this patent is extended or adjusted under 35 U.S.C. 154(b) by 0 days.

(21) Appl. No.: 15/941,887

(22) Filed: Mar. 30, 2018

(65) Prior Publication Data

US 2019/0072839 A1 Mar. 7, 2019

(30) Foreign Application Priority Data

Sep. 1, 2017 (CN) .......................... 2017 1 0778698

(51) Int. Cl.
*G03B 21/20* (2006.01)
*G03B 33/08* (2006.01)

(52) U.S. Cl.
CPC .......... *G03B 21/204* (2013.01); *G03B 33/08* (2013.01); *G03B 21/208* (2013.01); *G03B 21/2066* (2013.01)

(58) Field of Classification Search
CPC ....... G03B 21/204; G02B 26/008; F21K 9/64; F21V 1/17; F21V 3/08; F21V 3/12;
(Continued)

(56) References Cited

U.S. PATENT DOCUMENTS 10,416,440 B2 9/2019 Hu et al.
2011/0199580 A1* 8/2011 Hirata .................... G03B 21/20
353/31
(Continued)

FOREIGN PATENT DOCUMENTS

CN 202109406 U 1/2012
CN 102434792 A 5/2012
(Continued)

OTHER PUBLICATIONS

First Office Action dated Dec. 4, 2019 (17 pages including English translation) from corresponding Chinese Application No. 201710778698.3.
International Search Report and Written Opinion corresponding to International Application No. PCT/CN2018/081178 dated Jun. 1, 2018; 10 pages.

*Primary Examiner* — Michelle M Iacoletti
*Assistant Examiner* — Christopher A Lamb, II
(74) *Attorney, Agent, or Firm* — Brinks Gilson & Lione

(57) ABSTRACT

A color wheel includes a base substrate and at least one fluorescent block. The base substrate includes a first annular portion and a second annular portion. The at least one fluorescent block is arranged on the first annular portion. The fluorescent block is configured to emit fluorescent light in a predetermined wavelength band after being irradiated with a laser beam. The second annular portion includes at least one color filtering portion, and the color filtering portion is configured to filter the fluorescent light. An inner circumference of the second annular portion is not smaller than an outer circumference of the first annular portion, or an outer circumference of the second annular portion is not larger than an inner circumference of the first annular portion.

11 Claims, 6 Drawing Sheets

(58) Field of Classification Search
CPC ..... F21V 5/10; F21V 7/26; F21V 7/30; F21V 9/02; F21V 9/06; F21V 9/08; F21V 9/30; F21V 9/32; F21V 9/35; F21V 9/38; F21V 9/40; F21V 9/45; F21V 13/08; F21V 13/14; G02F 2001/133614; H01L 33/50
See application file for complete search history.

(56) References Cited

U.S. PATENT DOCUMENTS

| | | | | |
|---|---|---|---|---|
| 2011/0310363 | A1* | 12/2011 | Kita | G03B 21/204 353/98 |
| 2013/0258639 | A1* | 10/2013 | Hu | F21V 9/40 362/84 |
| 2015/0354787 | A1* | 12/2015 | Chang | H04N 9/00 362/84 |
| 2018/0172978 | A1 | 6/2018 | Hu et al. | |

FOREIGN PATENT DOCUMENTS

| | | |
|---|---|---|
| CN | 102540656 A | 7/2012 |
| CN | 102645829 A | 8/2012 |
| CN | 102720957 A | 10/2012 |
| CN | 202708991 U | 1/2013 |
| CN | 204759006 U | 11/2015 |
| CN | 105353578 A | 2/2016 |
| CN | 105549313 A | 5/2016 |
| CN | 105589287 A | 5/2016 |
| CN | 105629645 A | 6/2016 |
| CN | 205281104 U | 6/2016 |
| CN | 205608228 U | 9/2016 |
| CN | 106353959 A | 1/2017 |
| CN | 206321930 U | 7/2017 |

* cited by examiner

COLOR WHEEL AND LASER PROJECTION APPARATUS

CROSS-REFERENCE TO RELATED APPLICATION

This application claims priority to Chinese Patent Application No. 201710778698.3, filed on Sep. 1, 2017, titled "COLOR WHEEL, LASER PROJECTION LIGHT SOURCE AND LASER PROJECTION APPARATUS", which is incorporated herein by reference in its entirety.

TECHNICAL FIELD

The present disclosure relates to a color wheel and a laser projection apparatus.

BACKGROUND

In the field of laser projection display, and especially in the field of ultra-short-focus laser projection display, a light source system typically uses a blue laser beam and a fluorescent powder to create fluorescent light. The basic working principle for achieving light emission is that the blue laser beam excites the fluorescent powder on a phosphor wheel to generate fluorescent light in various primary colors.

SUMMARY

According to one aspect, some embodiments of the present disclosure provide a color wheel, comprising:
a base substrate comprising a first annular portion and a second annular portion, and
at least one fluorescent block arranged on the first annular portion, wherein the fluorescent block is configured to emit fluorescent light after being irradiated with a laser beam, wherein
the second annular portion comprises at least one color filtering portion, and the color filtering portion is configured to filter the fluorescent light, and wherein
an inner circumference of the second annular portion is not smaller than an outer circumference of the first annular portion, or an outer circumference of the second annular portion is not larger than an inner circumference of the first annular portion.

According to another aspect, some embodiments of the present disclosure provide a laser projection apparatus, comprising:
a laser transmitter configured to provide a laser beam, and
a color wheel, comprising:
a base substrate comprising a first annular portion and a second annular portion,
at least one fluorescent block arranged on the first annular portion, wherein the fluorescent block is configured to emit fluorescent light after being irradiated with a laser beam, wherein
the second annular portion comprises at least one color filtering portion, and the color filtering portion is configured to filter the fluorescent light, and wherein
an inner circumference of the second annular portion is not smaller than an outer circumference of the first annular portion, or an outer circumference of the second annular portion is not larger than an inner circumference of the first annular portion.

BRIEF DESCRIPTION OF THE DRAWINGS

The accompanying drawings herein are incorporated in the description and constitute a part of this description. The drawings show embodiments which are consistent with the present disclosure, and serve to explain the principles of the present disclosure together with the description. Obviously, the drawings described below are merely some embodiments of the present disclosure. For a person of ordinary skill in the art, other drawings can be obtained based on these drawings without paying any creative effort.

DETAILED DESCRIPTION

Exemplary embodiments will now be described more fully with reference to the accompanying drawings. However, the exemplary embodiments can be implemented in various forms and should not be construed as being limited to the examples set forth herein. These embodiments are provided so that the present disclosure will be thorough and complete, and the concept of the example embodiments will be fully conveyed to a person of ordinary skill in the art. The features, structures, or characteristics described can be combined in any suitable manner in one or more embodiments. In the following description, numerous specific details are provided to provide a thorough understanding of the embodiments of the present disclosure. However, a person of ordinary skill in the art will recognize that technical solutions of the present disclosure may be practiced while omitting one or more of the specific details, or that other methods, components, apparatuses, steps, etc. can be employed. In other instances, common technical solutions will not be shown or described in detail to avoid distracting the parties and obscuring aspects of the present disclosure.

The terms "one", "an", "the", and "said" are used in the present disclosure to mean that there are one or more elements/components/etc. The terms "comprising" and "having" are intended to mean a non-exclusive inclusion and mean that there may be additional elements/components/etc., in addition to the listed elements/components/etc. The terms "first" and "second" are used as labels only and do not limit the number of objects.

As shown in the figures, the annular portion is a portion of the substrate having an annular shape and can have a certain thickness. In addition, the fan annular shape means a shape the same as an overlapped section of an arbitrary fan shape and an annular shape which have a same center, and can also have a certain thickness.

Figure 1:
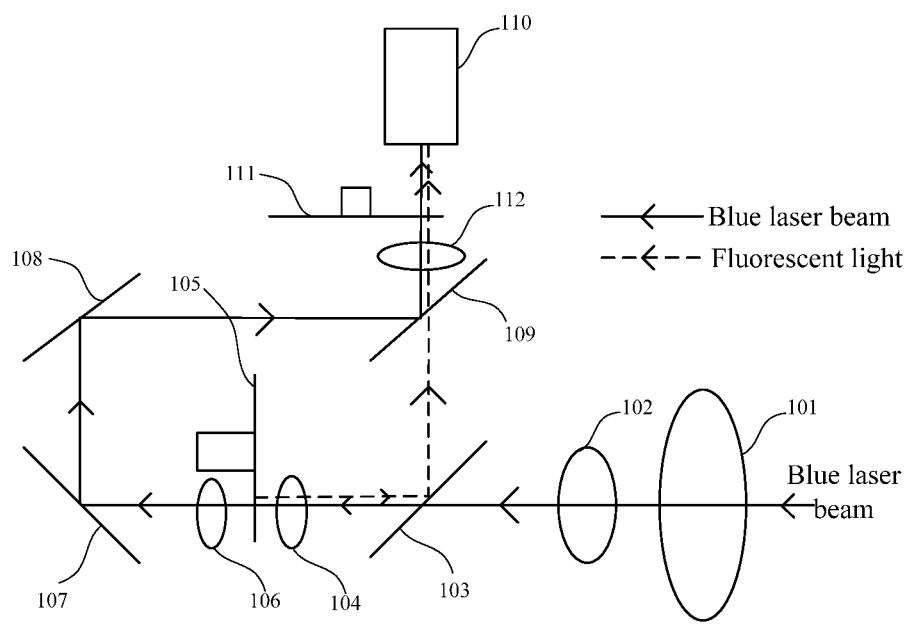
FIG. 1 shows a schematic structure diagram of a laser projection apparatus.

FIG. 1 shows a schematic structure diagram a laser projection apparatus. An original light source is a blue laser diode (BLD) that emits a blue laser beam, and a light path of the blue laser beam is marked as a solid line with arrows in FIG. 1. A light path of fluorescent light reflected by a phosphor wheel is marked as a dashed line with arrows in FIG. 1. The light source includes a reflective-type phosphor wheel 105, a collimating telescope element, a dichroic element 103, a converging lens 104, a converging lens 106 and a converging lens 112, a mirror 107 and a mirror 108 both for reflecting a blue laser beam, a dichroic element 109, a color filtering wheel 111 and a light pipe 110. The collimating telescope element includes lenses 101 and 102. The reflective-type phosphor wheel 105 generates fluorescent light under the excitation of the blue laser beam, and can be rotated by a motor. The collimating telescope element is configured to collimate the blue laser beam incident on the phosphor wheel 105. The dichroic element 103 is provided between the reflective-type phosphor wheel 105 and the collimating telescope element, and can transmit the blue laser beam incident thereon and reflect the fluorescent light. The converging lenses 104 and 106 are arranged on a light incident path located in front of the phosphor wheel and a light emergent path located at the back thereof, respectively, for converging light. The converging lens 112 is located on a light incident path located in front of the light filtering wheel 111 for converging the light. The mirrors 107 and 108 are configured to reflect the blue laser beam, which has passed through the reflective-type phosphor wheel 105, to the dichroic element 109. The dichroic element 109 is provided at an intersection position of a light path of the fluorescent light reflected by the dichroic element 103 and a light path of the blue laser beam reflected by the mirror 108, and can transmit the fluorescent light and reflect the blue laser beam. The color filtering wheel 111 is disposed on an light emergent path of the blue laser beam and the fluorescent light to be transferred eventually to the light pipe 110, and is configured to filter the fluorescent light in various primary colors generated by the reflective-type phosphor wheel 105. The light pipe 110 can receive and transfer the blue laser beam or the fluorescent light.

The basic working principle of this laser projection apparatus is that the blue laser beam excites the phosphor material on the reflective-type phosphor wheel 105 to generate fluorescent light in various primary colors. Since the fluorescent light spectrum is relatively wide and hence color saturation is low, the color filtering wheel 111 is additionally provided to filter various fluorescent light generated by the phosphor wheel 105 so as to increase the color saturation and enhance the color gamut.

Both the phosphor wheel 105 and the color filtering wheel 111 require a motor to drive. In order to ensure a one-to-one correspondence of colors, that is, each type of fluorescent light conversion area in the phosphor wheel 105 corresponds to a color filtering area in the color filtering wheel 111 for filtering the corresponding fluorescent light, a control program and a control circuit are used to ensure the high-speed synchronous operation of two devices.

Figure 2:
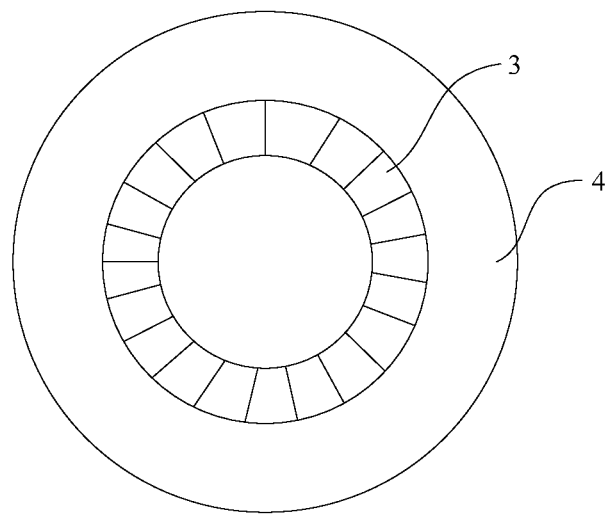
FIG. 2 shows a schematic structure diagram of a color wheel in some embodiments of the present disclosure.
Figure 3:
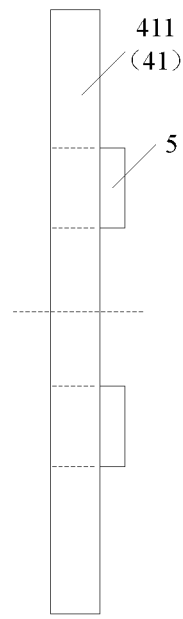
FIG. 3 shows a cross-sectional view of a color wheel in some embodiments of the present disclosure.
Figure 4:
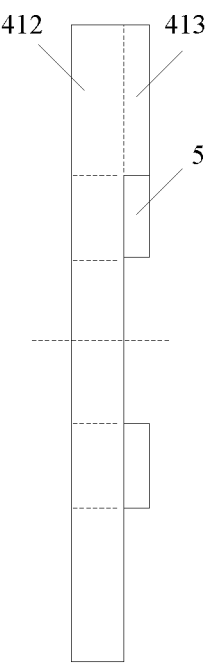
FIG. 4 shows a cross-sectional view of another color wheel in some embodiments of the present disclosure.

Some embodiments of the present disclosure provide a color wheel. As shown in FIG. 2 to FIG. 4, the color wheel includes a base substrate, and the base substrate includes a first annular portion 3 and a second annular portion 4. The first annular portion 3 and the second annular portion 4 are set in nest. In some embodiments, the first annular portion 3 and the second annular portion 4 are arranged concentrically. In some examples, an inner circumference of the second annular portion 4 is not smaller than an outer circumference of the first annular portion 3, that is the inner diameter of the second annular portion 4 is not smaller than the outer diameter of the first annular portion 3. In some other examples, an outer circumference of the second annular portion 4 is not larger than an inner circumference of the first annular portion 3, that is the outer diameter of the second annular portion 4 is not larger than the inner diameter of the first annular portion 3. The color wheel also includes at least one fluorescent block 5 arranged on the first annular portion 3. The fluorescent block 5 is configured to emit fluorescent light in a predetermined wavelength band by laser beam irradiation. The second annular portion 4 includes at least one color filtering portion 41. The color filtering portion 41 is configured to filter the above fluorescent light. In some embodiments, the color filtering portion 41 also can filter the light beam of the laser transmitter.

By providing one base substrate with the fluorescent block 5 and the color filtering portion 41, the synchronous rotation of the fluorescent block 5 and the color filtering portion 41 may be ensured. Therefore, not only a problem of color misalignment may be avoided, but also a problem of reduced system efficiency caused by synchronizing two individual devices may be avoided. In addition, by providing one base substrate with the fluorescent block 5 and the color filtering portion 41, a situation that a phosphor wheel having an aluminum base substrate and a color filtering wheel having a glass base substrate are arranged on one drive shaft and driven by one motor may be avoided, and thus the size and weight may be reduced, so that the color wheel is lighter.

In some embodiments of the present disclosure, the fluorescent block 5 is formed of a phosphor powder coated in a certain area on the base substrate. In other embodiments, the fluorescent block 5 is formed of an inorganic phosphor adhered to a certain area on the base substrate.

In some embodiments of the present disclosure, as shown in FIG. 3, the color filtering portion 41 includes a first color filtering portion 411. The first color filtering portion 411 is made of a material having a color filtering function, such as, a polymer material. That is, the first color filter portion 411 is part of the base substrate, the material of the first color filter portion 411 is different from the material of other portions of the second annular portion of the base substrate other than the first color filter portion 411, and the material of the first color filter portion can transmit light in a preset wavelength band and absorb other light outside the preset wavelength band. In some embodiments, the first color filtering portion occupies a part of the color filtering portion. Exemplarily, a central angle of the second annular portion is 360°, a central angle corresponding to the color filtering portion is a first central angle, and a central angle corresponding to the first color filtering portion is a second central angle. The second central angle is a part of the first central angle and is smaller than the first central angle.

In other embodiments, as shown in FIG. 4, the color filtering portion 41 includes a body portion 412 and a second color filtering portion 413, and the second color filtering portion 413 is made of a material having a color filtering function. In some examples, the body portion 412 is made of a transparent material and can transmit light. The base substrate is a transparent base substrate, and the body portion 412 is part of the transparent base substrate. The second color filtering portion 413 is a color filtering film or a color filtering coating layer coated on the body portion. By using the transparent base substrate and providing different films on one base substrate to achieve the arrangement of the fluorescent block 5 and the color filtering portion 41, the process may be easier. In some embodiments, the transparent base substrate is a glass base substrate.

In some embodiments of the present disclosure, the laser beam includes a blue laser beam, and the laser source is a blue laser diode (BLD). In other embodiments of the present disclosure, the laser source is a light emitting diode (LED) which emits the blue laser beam or ultraviolet (UV) light, and the laser source is not specifically limited for the present disclosure herein.

In some embodiments of the present disclosure, as shown in FIG. 2, the inner circumference of the second annular portion 4 is greater than or equal to the outer circumference of the first annular portion 3. The embodiments of the present disclosure are described by taking this structure as an example. In other embodiments, the outer circumference of the second annular portion 4 is smaller than or equal to the inner circumference of the first annular portion 3. In some examples, when the light source including such a color wheel is designed, since the place where the blue laser beam irradiates the fluorescent block 5 is different from the place where the fluorescent light irradiates the color filtering portion 41, reference to a laser projection apparatus shown in FIGS. 8 and 9, the blue laser beam is arranged to correspond to the fluorescent block 5 irradiated therewith, and accordingly, the fluorescent light is arranged to correspond to the color filtering portion 41 irradiated therewith. The place and sizes of the first annular portion 3 and the second annular portion 4 of the color wheel provided by the embodiments of the present disclosure can be designed comprehensively according to the light source, and are not limited to the above several embodiments, which the is not specifically limited herein.

Figure 5:
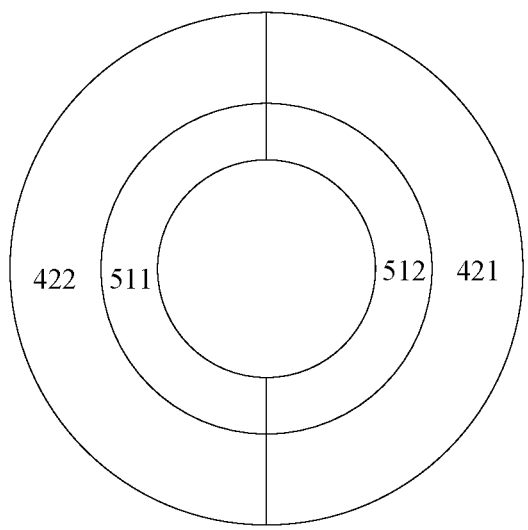
FIG. 5 shows a schematic structure diagram of still another color wheel in some embodiments of the present disclosure.

In some embodiments of the present disclosure, as shown in FIG. 5, the at least one fluorescent block 5 includes at least two fluorescent blocks 5. The at least two fluorescent blocks 5 emit at least one fluorescent light. The at least one color filtering portion 41 includes at least two color filtering portions 41, and the at least two color filtering portions 41 filter the at least one fluorescent light. For example, as shown in FIG. 5, the at least one fluorescent block 5 includes a first fluorescent block 511 and a second fluorescent block 512. The first fluorescent block 511 is configured to emit a green fluorescent light after being irradiated with the laser beam. The second fluorescent block 512 is configured to emit a yellow fluorescent light after being irradiated with the laser beam. The at least two color filtering portions 41 include a first color filtering portion 421 and a second color filtering portion 422. The first color filtering portion 421 is configured to filter the green fluorescent light emitted from the first fluorescent block 511 to obtain green light. The second filter portion 422 is configured to filter the yellow fluorescent light emitted from the second fluorescent block 512 to obtain light in different colors, such as yellow light, green light and red light.

In some embodiments, the at least two fluorescent blocks 5 are arranged, in fan annular shapes, on the first annular portion, and the at least two color filtering portions 41 respectively corresponding to the at least two fluorescent blocks 5 are arranged in fan annular shapes. For example, as shown in FIG. 5, the first fluorescent block 511 and the second fluorescent block 512 are arranged, in fan annular shapes, on the first annular portion, and the first filter portion 421 and the second filter portion 422 are arranged in fan annular shapes.

In some embodiments of the present disclosure, as shown in FIG. 5, the first fluorescent block 511 and the second fluorescent block 512 have a same central angle. That is, the center angle of each fluorescent block 5 is 180°. Correspondingly, the first filter portion 421 and the second filter portion 422 have a same central angle. That is, the central angle of each color filtering portion 41 is 180°. In other embodiments of the present disclosure, the fluorescent blocks 5 and the color filtering portions 41 do not have the same central angle, and the central angles of the fluorescent blocks 5 and the color filtering portions 41 are set according to the brightness requirements for fluorescent light in different colors.

In some embodiments of the present disclosure, the at least one fluorescent block 5 includes a fluorescent block 5 disposed, in an annular shape, on the first annular portion, and the at least one color filtering portion 41 includes a color filtering portion 41 provided in the annular shape.

In some embodiments of the present disclosure, each of the at least one fluorescent block 5 is selected from a group consisting of a green fluorescent block, a yellow fluorescent block or a red fluorescent block. For example, fluorescent light emitted from the green fluorescent block is filtered by the color filtering portion 41 to obtain green light. Fluorescent light emitted from the yellow fluorescent block is filtered by using another color filtering portion 41 (that is, a color filtering portion 41 in a different color at a different place) to obtain light in different colors such as yellow light, green light, and red light. The fluorescent light emitted from the red fluorescent block is filtered by using a further color filtering portion 41 (that is, a color filtering portion 41 in a different color at a different place) to obtain red light. In other embodiments of the present disclosure, the at least one fluorescent block 5 includes at least one of a fluorescent block 5 excited by a violet laser beam, a fluorescent block 5 excited by a blue laser beam, and the like, to which the present disclosure is not specifically limited.

In some embodiments of the present disclosure, the at least one fluorescent block 5 includes only one fluorescent block 5. The fluorescent block 5 is configured to emit the fluorescent light when being irradiated with the laser beam. The at least one color filtering portion 41 includes a plurality of color filtering portions 41, and the plurality of the color filtering portions 41 filter the fluorescent light. For example, the at least one fluorescent block 5 includes only a yellow fluorescent block disposed on the first annular portion 3. Correspondingly, the at least one color filtering portion includes a plurality of color filtering portions 41. The fluorescent light emitted from the yellow fluorescent block after being irradiated with the laser beam is filtered through the plurality of color filtering portions 41 (that is, color filtering portions at different places in the second annular portion 4) to obtain the yellow light, the green light, the red light and the like. In some examples, the fluorescent block 5 is disposed, in an angular shape, on the first annular portion 3. In some examples, the plurality of color filtering portions 41 includes two, three, or even four color filtering portions 41, and these color filtering portions 41 are arranged in a fan annular shape. For example, the plurality of color filtering portions 41 have a same central angle. Alternatively, the corresponding central angles of the respective color filtering portions 41 are set according to the brightness requirements for different color fluoresces.

In some embodiments of the present disclosure, the first annular portion 3 includes a first transmission portion capable of transmitting the laser beam, so that a laser beam in a predetermined wavelength band is directly provided as a color source. The first transmission portion is a portion of the first annular portion 3 on which no fluorescent block 5 is provided. Since a laser source is, for example, the blue laser diode emitting the blue laser beam, in some embodiments, the first transmission portion is referred to as a blue light transmission portion.

In some embodiments of the present disclosure, the second annular portion 4 further includes a second transmission portion. The second transmission portion is configured to transmit or scatter the laser beam passing through the first transmission portion 311.

Figure 6:
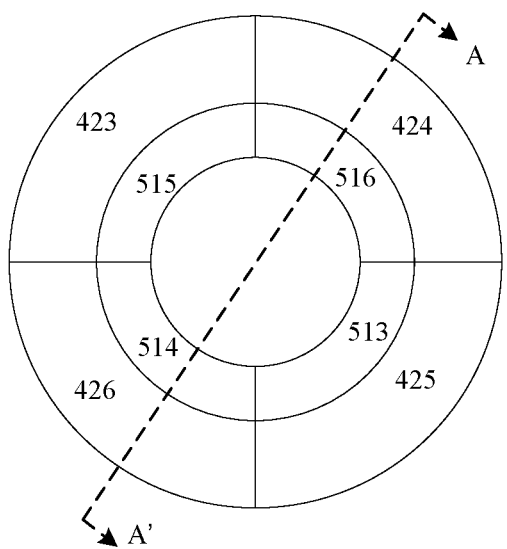
FIG. 6 shows a schematic structure diagram of yet another color wheel in some embodiments of the present disclosure.

For example, as shown in FIG. 6, a third fluorescent block 513, a fourth fluorescent block 514, and a fifth fluorescent block 515 are arranged on the first annular portion, and the first annular portion includes a first transmission portion 516. The second annular portion includes a third color filtering portion 423, a fourth color filtering portion 424, a fifth color filtering portion 425 and a second transmission portion 426. The third fluorescent block 513 corresponds to a green fluorescent block that emits fluorescent light after being irradiated with the laser beam. The third color filtering portion 423 filters the fluorescent light to obtain green light. The fourth fluorescent block 514 corresponds to a yellow fluorescent block that emits fluorescent light after being irradiated with the laser beam. The fourth color filtering portion 424 filters the fluorescent light to obtain yellow light. The fifth fluorescent block 515 corresponds to a red fluorescent block that emits fluorescent light after being irradiated with the laser beam. The fifth color filtering portion 425 filters the fluorescent light to obtain red light. The first transmission portion 516 transmits the laser beam, and the second transmission portion 426 is a transparent portion or a blue color filtering portion, and correspondingly transmits or filters the laser beam.

In some embodiments, as shown in FIG. 6, the third fluorescent block 513, the fourth fluorescent block 514, the fifth fluorescent block 515 and the first transmission portion 516 are all arranged in an fan annular shape. In addition, the third color filtering portion 423, the fourth color filtering portion 424, the fifth color filtering portion 425 and the second transmission portion 426 are all arranged in an fan annular shape. For example, the central angles of the above components are all 90 degrees. However, in practical applications, the central angles of the above components are set according to the brightness requirement for the fluorescent light in different colors.

In some embodiments of the present disclosure, the color wheel further includes an antireflective film disposed on either or both of surfaces of the first transmission portion. This antireflective film is, for example, the antireflective film 6 shown in FIG. 7. In some embodiments of the present disclosure, the color wheel further includes a antireflective film arranged on either or both of surfaces of the second transmission portion. This antireflective film is, for example, the antireflective film 7 shown in FIG. 7.

In some embodiments of the present disclosure, the at least one fluorescent block 5 includes a green fluorescent block and a yellow fluorescent block arranged on the first annular portion 3, and the first annular portion 3 includes the first transmission portion. Correspondingly, the second annular portion 4 includes color filtering portions 41 corresponding to the green fluorescent block and the yellow fluorescent block, respectively. In addition, in order to obtain red light by filtering the yellow fluorescent light, in some embodiments, the second annular portion 4 further includes a red color filtering portion. It should be noted that when the central angle of the fan annular shape corresponding to several fluorescent portions and the first transmission portion is designed, since the yellow fluorescent light needs to be filtered to obtain the yellow light and the red light, consideration should be given to the brightness requirements of the yellow light and the red light so as to comprehensively design.

In some embodiments of the present disclosure, in order to facilitate the assembly of various optical components, light paths are maintained to be in a same vertical plane or horizontal plane. At this point, a center line of the fan annular shape corresponding to the color filtering portion and the center line of the fan annular shape corresponding to the corresponding fluorescent block are on a same straight line as the center of a circle. For example, as shown in FIG. 6, the center line of the fan annular shape corresponding to the third filter portion 423 and the center line of the fan annular shape corresponding to the third fluorescent block 513 are on the same straight line as the center of the circle. The center line of the fan annular shape corresponding to the fourth color filtering portion 424 and the center line of the fan annular shape corresponding to the fourth fluorescent block 514 are on the same straight line as the center of the circle. The center line of the fan annular shape corresponding to the second transmission portion 426 and the center line of the fan annular shape corresponding to the first transmissive portion 516 are on the same straight line as the center of the circle.

Figure 7:
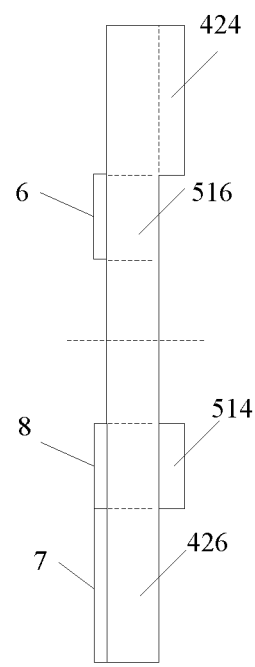
FIG. 7 shows a cross-sectional view taken along line AA' of FIG. 6.

In some embodiments, the color wheel further includes a reflective film in order to increase the fluorescent light conversion efficiency. The reflective film is disposed on a surface of the first annular portion opposite to a surface on which at least one fluorescent block 5 is located. As shown in FIG. 7, the reflective film is, for example, the reflective film 8.

In the following, the area of the first annular portion, which is capable of reflecting the fluorescent light and corresponds to the at least one fluorescent block 5, is referred to as a reflective-type fluorescent light conversion area. The area of the first annular portion, capable of transmitting fluorescent light and corresponds to the at least one fluorescent block 5, is referred to as a transmission type fluorescent light conversion area.

Figure 8:
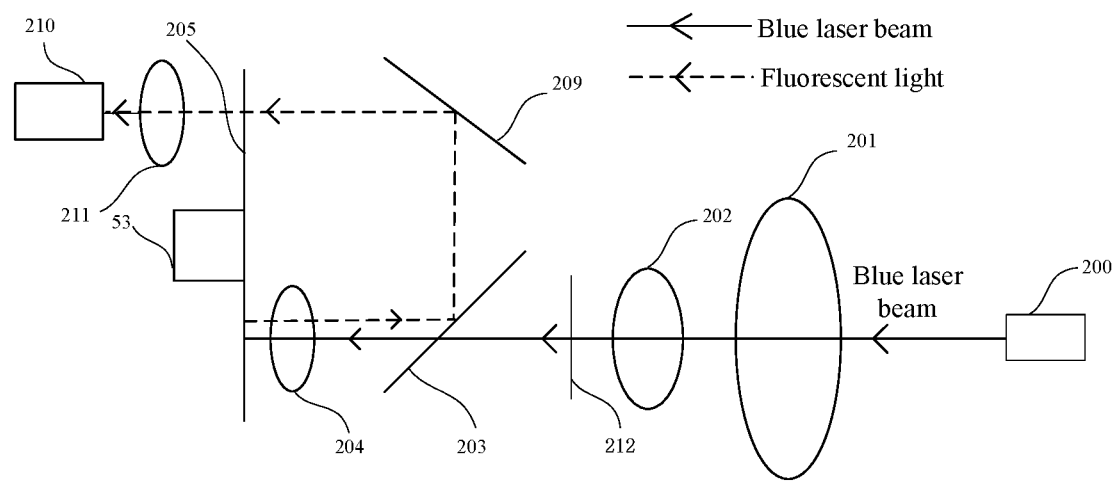
FIG. 8 shows a schematic view of a laser projection apparatus in some embodiments of the present disclosure.
Figure 9:
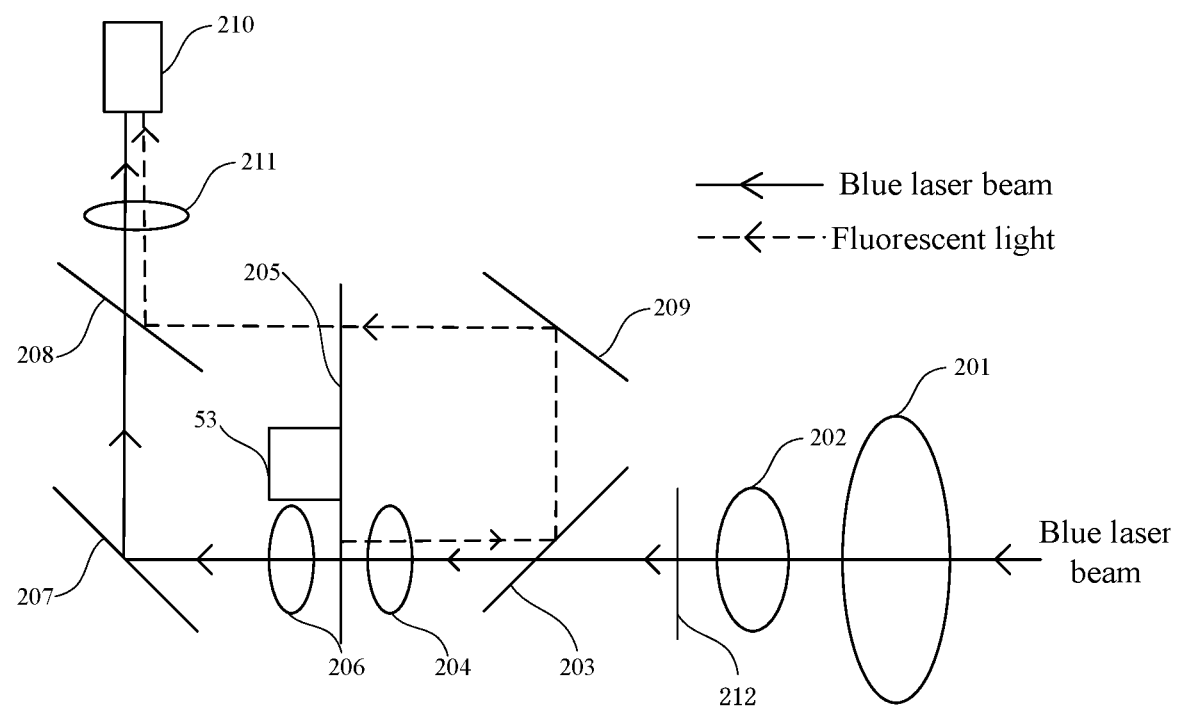
FIG. 9 shows a schematic view of another laser projection apparatus in some embodiments of the present disclosure.
Figure 10:
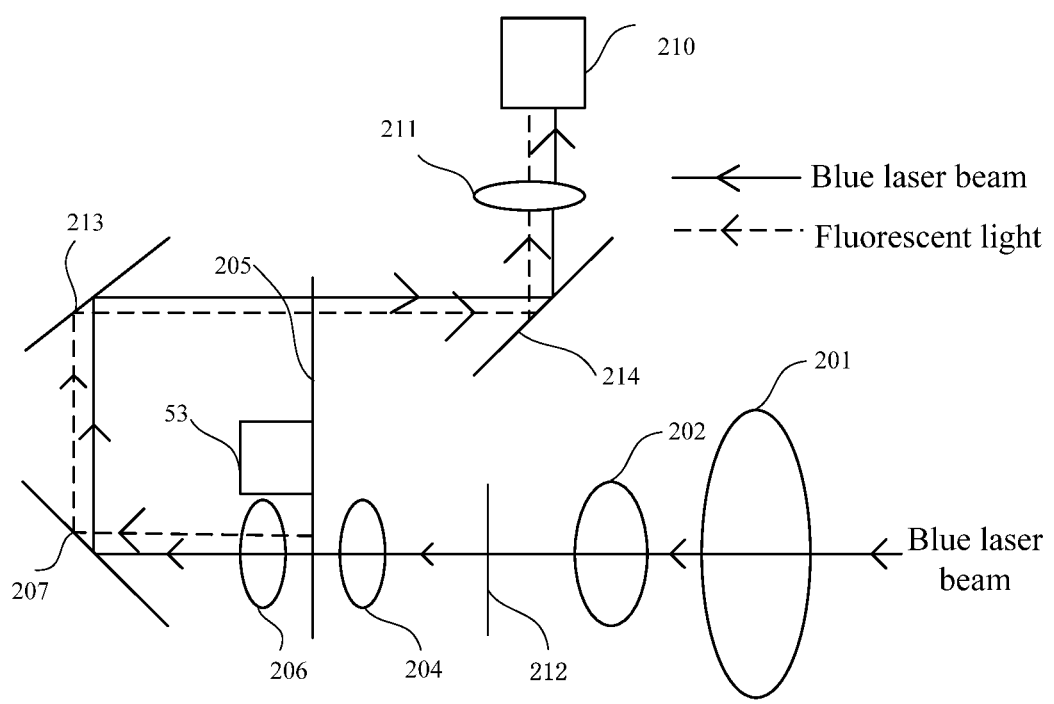
FIG. 10 shows a schematic view of still another laser projection apparatus in some embodiments of the present disclosure.

FIG. 8 shows a schematic view of a laser projection apparatus in some embodiments of the present disclosure. FIG. 9 shows a schematic view of another laser projection apparatus in some embodiments of the present disclosure. FIG. 10 shows a schematic view of yet another laser projection apparatus in some embodiments of the present disclosure.

Some embodiments of the present disclosure provide a laser projection apparatus. As shown in FIGS. 8-10, the laser projection apparatus includes a color wheel 205 and a laser source 200. The color wheel 205 refers to the above embodiments and will not be described again here. The laser source 200 is configured to provide laser beam to the color wheel 205, such as a blue laser beam. An light path of the blue laser beam is marked as a solid line in the figures.

When the laser projection apparatus including the color wheel is designed, since one color filtering wheel is removed, the structure of the laser projection apparatus may be simplified and the volume of the laser projection apparatus may thus be reduced. In addition, the light path distance may be shorter so that the angle of the fluorescent light incident on the color filtering portion is close to 0° and the loss of fluorescent light will also be decreased, thereby indirectly increasing the efficiency of the laser projection apparatus.

In some embodiments, as shown in FIG. 8 to FIG. 10, the color wheel 205 includes a motor 53. In some examples, the motor 53 is fixed to the color wheel 205 and is configured to drive the color wheel 205 to rotate. In some embodiments, the laser projection apparatus further includes a light pipe 210.

In some embodiments, as shown in FIG. 8, the color wheel 205 includes a reflective type fluorescent light conversion area in the first annular portion, and the laser projection apparatus further includes a first dichroic element 203 and a first mirror 209. The first dichroic element 203 is located between the laser source 200 and the color wheel 205, and is configured to transmit the laser beam emitted by the laser source 200 to the first annular portion and reflect the fluorescent light, which is emitted from the fluorescent block after being irradiated with the laser beam, onto the first annular portion. An light path of the fluorescent light is marked as a dashed line in the figures. The first mirror 209 is provided on a light path of the fluorescent light reflected by the first dichroic element 203 and is configured to reflect the fluorescent light reflected by the first dichroic element 203 to the second annular portion. In some embodiments, as shown in FIG. 8, the light pipe 210 is provided on a light emergent path of the fluorescent light passing through the second annular portion and configured to receive and transmit the filtered color fluorescent light.

In some embodiments, as shown in FIG. 9, the laser projection apparatus further includes a collimating telescope 202 arranged between the color wheel 205 and the laser source 200. The first dichroic element 203 is arranged between the first annular portion and the collimating telescope 202.

In some embodiments, as shown in FIG. 7, the color wheel 205 includes a reflective type fluorescent light conversion area in the first annular portion and a transmission portion within the first annular portion which is capable of transmitting the laser beam. In some examples, the laser projection apparatus also includes a second mirror 207 and a second dichroic element 208. The second mirror 207 is arranged on a light emergent path of the blue laser beam passing through the transmission portion, and is configured to reflect a transmitted blue laser beam to the light pipe 210. The second dichroic element 208 is arranged between the second mirror 207 and the light pipe 210 and on a light emergent path of the other types of fluorescent light passing through the color filtering portion in the second annular portion of the color wheel 205, and is configured to transmit the blue laser beam reflected by the second mirror 207 and to reflect the other types of the fluorescent light emitted from the color filtering portion in the second annular portion of the color wheel 205, so that the blue laser beam and the fluorescent light are transmitted to the light pipe 210 in a same direction.

In some embodiments, when a motor 53 drives the color wheel 205 to rotate, several fluorescent blocks on the first annular portion are excited by the blue laser beam to emit fluorescent light in corresponding colors. When the blue laser beam is irradiated to the blue light transmission portion in the first annular portion of the color wheel 205, the blue laser beam is directly transmitted. Therefore, it is necessary to provide a second mirror 207 on the light emergent path of the blue laser beam at the back of the color wheel 205. The second mirror 207 reflects the blue laser beam to the light pipe 210. In addition, the second dichroic element 208 is arranged at the intersection position of the blue laser beam reflected by the second mirror 207 and the fluorescent light reflected by the first mirror 209, and is configured to transmit the blue laser beam while reflecting the fluorescent light, so that the blue laser beam and the fluorescent light are transmitted to the light guide 210 in a same direction.

It should be noted that in some embodiments, the color wheel 205 includes a transmission type fluorescent light conversion area in the first annular portion and a transmission portion in the first annular portion, which is capable of transmitting the fluorescent light.

In some embodiments, as shown in FIGS. 9 and 10, the laser projection apparatus includes one or more of a collimating telescope 201, a collimating telescope 202, a diffusion sheet 212, a converging lens 204, a converging lens 206, and a converging lens 211. In some embodiments, as shown in FIG. 9, the blue laser beam passes through the collimating telescope 201, the collimating telescope 202 and the converging lens 204 successively and then enters the first annular portion of the color wheel 205. Then, the blue laser beam passes through the converging lens 206 and then is converged to the converging lens 211. The converging lens 211 is arranged on the light path of the blue laser beam and the light path of the fluorescent light transferred to the light guide 210 to converge the blue laser beam and the fluorescent light to the light pipe 210.

In some embodiments of the present disclosure, as shown in FIG. 10, the color wheel 205 includes the transmission type fluorescent light conversion area in the first annular portion, that is, the color wheel 205 is excited by blue laser irradiation and transmits fluorescent light. In addition, the color wheel comprises a transmission portion within the first annular portion which is capable of transmitting the blue laser beam. In some embodiments, the laser projection apparatus includes a second mirror 207, a third mirror 213, and a fourth mirror 214. In addition, the laser projection apparatus can further include one or more of the collimating telescope 201, the collimating telescope 202, the diffusion sheet 212, the converging lens 204, the converging lens 206 and the converging lens 211. The specific structure and principle of the laser projection apparatus are similar to those of the above embodiments, and will not be further described herein.

In some embodiments, the laser source is a bi-color laser source, i.e., includes two laser emitters which emit the laser beams in two different colors, such as, one of which is a blue laser emitter and the other is a red laser emitter. When the bi-color laser source includes the blue laser emitter and the red laser emitter, a light path of the laser beam emitted from the blue laser emitter may adopt any of the above designs. The laser beam emitted from the red laser emitter may incident on the second annular portion of the color wheel along the light path of the fluorescent light entering the second annular portion, and is shone onto the red color filtering portion in the second annular portion with the rotation of the color wheel. The red laser beam emitted from the red color filtering portion may enter the light pipe 210 along the light path of the light in other colors emitted from the second annular portion. In other embodiments, red laser beam emitted from the red laser emitter enters the light guide tube 210 through at least some optical components except the second annular portion. For example, the red laser emitter is provided at a side of the mirror 207 away from the light pipe in FIG. 9. The mirror 207 is replaced by a dichroic element that reflects blue light and transmits red light. The dichroic element 208 is replaced by a dichroic element that transmits the red light and the blue light and reflects green light. By reflecting the green dichroic element, and thus light in three colors can be converged into the light pipe.

In some embodiments, the second annular portion 4 is provided with scattering particles therein. In some examples, the first color filtering portion 411 is provided with scattering particles therein. In other examples, the second color filtering portion 413 is provide with the scattering particles therein. Alternatively, both the main body 412 and the second color filtering portion 413 are provided with scattering particles therein.

In some embodiments, the laser projection apparatus further includes a light combining portion, an optical switch, a projection lens and the like.

The laser projection apparatus in the embodiments of the present disclosure has its beneficial effects described in detail in the above-mentioned color wheel, which will not be described repeatedly herein.

A person of ordinary skill in the art will readily recognize other embodiments of the present disclosure upon consideration of the description and practice of the disclosure herein. This application is intended to cover any variations, uses, or adaptive changes of the present disclosure. These variations, uses, or adaptive changes follow the general principles of the present disclosure and include common knowledge or customary techniques in the technical field that are not disclosed in this disclosure. The description and embodiments are to be regarded as merely illustrative. The true scope and spirit of the present disclosure are pointed out in the appended claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A laser projection apparatus, comprising:
   a laser transmitter configured to provide a laser beam,
   a color wheel, comprising:
      a base substrate, wherein the base substrate is a transparent base substrate and comprises a first annular portion and a second annular portion, the base substrate is configured to rotate about a driving shaft arranged on the base substrate,
      at least one fluorescent block and a first transmission portion arranged on the first annular portion, wherein each of the at least one fluorescent block is configured to emit a corresponding predetermined wavelength band of fluorescence after being irradiated with the laser beam, and the first transmission portion is configured to transmit the laser beam,
      at least one color filtering portion arranged on part of the second annular portion, wherein each of the at least one color filtering portion is configured to filter the fluorescence with a corresponding predetermined band,
      a reflective film, wherein the reflective film is disposed on a surface of the first annular portion opposite to a surface on which the at least one fluorescent block is located, the reflective film is opposite to the at least one fluorescent block;
      wherein a fluorescent block and a color filtering portion corresponding to the fluorescence with a same predetermined band are respectively located on two sides of the driving shaft,
      wherein an inner circumference of the second annular portion is not smaller than an outer circumference of the first annular portion, or an outer circumference of the second annular portion is not larger than an inner circumference of the first annular portion;
   a first dichroic element arranged between the laser transmitter and the color wheel, and configured to transmit the laser beam to the first annular portion and reflect the fluorescence;
   a first mirror configured to reflect the fluorescence reflected by the first dichroic element to the second annular portion;
   a second mirror provided on a light outgoing path of the laser beam passing through the first transmission portion, and configured to reflect the laser beam passing through the first transmission portion; and
   a second dichroic element disposed at an intersection position of a light path of the laser beam reflected by the second mirror and a light outgoing path of the fluorescence passing through the second annular portion, and configured to direct the laser beam reflected by the second mirror and the fluorescence passing through the second annular portion transmit in a same direction.

2. The laser projection apparatus according to claim 1, further comprising a light pipe; wherein,
   the laser beam emitted by the laser transmitter passes through the first dichroic element and reaches the color wheel;
   a part of the laser beam is transmitted through the first transmission portion on the color wheel to the second mirror, and is reflected by the second mirror to the second dichroic element, then passes through the second dichroic element and reaches the light pipe;
   a part of the laser beam irradiates the at least one fluorescent block on the color wheel to generate the fluorescence, the fluorescence is reflected by the reflective film on the color wheel and returns to the first dichroic element, then the fluorescence is reflected by the first dichroic element to the first mirror, and reflected by the first mirror to the color wheel again, the fluorescence is transmitted through the at least one color filtering portion on the color wheel to the second dichroic element, and reflected by the second dichroic element to the light pipe.

3. The laser projection apparatus according to claim 1, wherein the color filtering portion comprises a first color filtering portion, and the first color filtering portion is made of a material having a color filtering function.

4. The laser projection apparatus according to claim 1, wherein the color filtering portion comprises a body portion and a second color filtering portion provided on a surface of the body portion, and the second color filtering portion is made of a material having a color filtering function.

5. The laser projection apparatus according to claim 1, wherein the at least one fluorescent block comprises at least two fluorescent blocks which are configured to emit at least one fluorescence after being irradiated with the laser beam, and the at least one color filtering portion comprises at least two color filtering portions which are configured to filter the at least one fluorescence.

6. The laser projection apparatus according to claim 5, wherein the at least two fluorescent blocks are arranged, in fan annular shapes, on the first annular portion, and the at least two color filtering portion respectively corresponding to the at least two fluorescent blocks are arranged in fan annular shapes.

7. The laser projection apparatus according to claim 1, wherein the at least one fluorescent block comprises a fluorescent block provided, in an annular shape, on the first annular portion, and the at least one color filtering portion comprises a color filtering portion provided in an annular shape.

8. The laser projection apparatus according to claim 1, wherein the at least one fluorescent block comprises only one fluorescent block which is configured to emit fluorescence after being irradiated with the laser beam, and the at least one color filtering portion comprises a plurality of color filtering portions which are configured to filter the fluorescence.

9. The laser projection apparatus according to claim 1, wherein each of the at least one fluorescent block is selected from a group consisting of a green fluorescent block, a yellow fluorescent block or a red fluorescent block.

10. The laser projection apparatus according to claim 1, wherein the second annular portion further comprises a second transmission portion which is configured to transmit the laser beam which passes through the first transmission portion.

11. The laser projection apparatus according to claim 1, further comprising an antireflective film provided on a surface of the first transmission portion.

* * * * *

UNITED STATES PATENT AND TRADEMARK OFFICE
CERTIFICATE OF CORRECTION

PATENT NO. : 10,732,496 B2
APPLICATION NO. : 15/941887
DATED : August 4, 2020
INVENTOR(S) : Fei Zhao It is certified that error appears in the above-identified patent and that said Letters Patent is hereby corrected as shown below:

On the Title Page

In item (73), replace HISENSE INTERNATIONAL CO., LTD., Qingdao, Shandon with -- HISENSE INTERNATIONAL CO., LTD., Qingdao, Shandong --.

Signed and Sealed this
Third Day of November, 2020

Andrei Iancu
*Director of the United States Patent and Trademark Office*